United States Patent
Sudharshan et al.

(10) Patent No.: US 9,929,878 B1
(45) Date of Patent: Mar. 27, 2018

(54) AUTO DETECTION AND PREVENTION OF LOOP, SEGMENTATION AND TRAFFIC OUTAGE IN A G.8032 RING NETWORK

(71) Applicants: Hariprasad Sudharshan, Chennai (IN); Michael Colven, Dallas, TX (US); Swati Mittal, Murphy, TX (US); Maitreya Mukhopadhyay, Allen, TX (US); Rajnath Singh, Murphy, TX (US)

(72) Inventors: Hariprasad Sudharshan, Chennai (IN); Michael Colven, Dallas, TX (US); Swati Mittal, Murphy, TX (US); Maitreya Mukhopadhyay, Allen, TX (US); Rajnath Singh, Murphy, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/266,711

(22) Filed: Sep. 15, 2016

(51) Int. Cl.
*H04L 12/43* (2006.01)
*H04L 12/437* (2006.01)
*H04L 12/46* (2006.01)

(52) U.S. Cl.
CPC ........ *H04L 12/437* (2013.01); *H04L 12/4641* (2013.01)

(58) Field of Classification Search
CPC .......................... H04L 12/437; H04L 12/4625
USPC .................................................. 370/216, 223
See application file for complete search history.

(56) References Cited

U.S. PATENT DOCUMENTS

| 6,430,151 | B1* | 8/2002 | Glas | H04L 1/22 370/222 |
| 2005/0201409 | A1* | 9/2005 | Griswold | H04L 12/42 370/445 |
| 2007/0025275 | A1* | 2/2007 | Tallet | H04L 45/02 370/255 |
| 2007/0106737 | A1* | 5/2007 | Barnes | G06Q 10/107 709/206 |
| 2008/0198769 | A1* | 8/2008 | Tzeng | H04L 12/462 370/256 |
| 2008/0250124 | A1* | 10/2008 | Rentschler | H04L 12/437 709/220 |
| 2008/0279203 | A1* | 11/2008 | Ramalho Ribeiro dos Santos | H04L 45/02 370/406 |
| 2010/0135154 | A1* | 6/2010 | Cheung | H04L 12/437 370/223 |
| 2010/0309821 | A1* | 12/2010 | Sergeev | H04L 12/437 370/256 |

(Continued)

*Primary Examiner* — Asad Nawaz
*Assistant Examiner* — Berhanu Belete
(74) *Attorney, Agent, or Firm* — Baker Botts L.L.P.

(57) ABSTRACT

Methods and systems are provided for managing an Ethernet ring protection switching (ERPS) protocol in an Ethernet network. The method includes receiving an administrative data packet at a first network element; determining whether the administrative data packet contains an ERPS membership setting from a second network element; when the administrative data packet contains the ERPS membership setting from the second network element, comparing an ERPS membership setting at the first network element to the ERPS membership setting from the second network element; and performing an action when the ERPS membership setting at the first network element is different than the ERPS membership setting from the second network element.

16 Claims, 6 Drawing Sheets

(56) References Cited

U.S. PATENT DOCUMENTS

| | | | | |
|---|---|---|---|---|
| 2012/0250695 A1* | 10/2012 | Jia | ............................ | H04L 12/42 370/400 |
| 2013/0064071 A1* | 3/2013 | Bos | ........................ | H04L 12/437 370/223 |
| 2013/0254356 A1* | 9/2013 | Eastlake, III | ............ | H04L 45/74 709/220 |
| 2015/0085637 A1* | 3/2015 | Nahlous | ................. | H04L 12/437 370/217 |
| 2016/0191302 A1* | 6/2016 | Tsubota | ................... | H04B 3/36 370/222 |

* cited by examiner

AUTO DETECTION AND PREVENTION OF LOOP, SEGMENTATION AND TRAFFIC OUTAGE IN A G.8032 RING NETWORK

BACKGROUND

Field of the Disclosure

The present disclosure relates to computer networking, and more specifically, management of a Ethernet ring protection switching protocol.

Description of the Related Art

Ethernet networks are often comprised of network elements communicating information back and forth to each other. Information may be communicated between network elements in the form of data packets, or blocks of data individually sent and delivered. The network elements (e.g., routers, switches, and bridges) may process incoming data packets to determine the appropriate network link on which to forward the data packet in order for the data packet to reach its target destination.

A loop among network elements (i.e., a network loop) may degrade network performance or cause network failure. Thus, loop-breaking protocols may be implemented in a network to prevent loops from occurring between the network elements. Examples of loop-breaking protocols include spanning tree protocol (STP), rapid spanning tree (RSTP), multiple spanning tree (MSTP), and Ethernet ring protection switching (ERPS) protocol as defined by the Institute of Electrical and Electronic Engineers (IEEE) 802 standards and the International Telecommunication Union Telecommunication Standardization Sector (ITU-T) G.8032 Recommendation.

SUMMARY

In particular embodiments, a method includes receiving an administrative data packet at a first network element. The method also includes determining whether the administrative data packet contains an ERPS membership setting from a second network element. The method further includes if the administrative data packet contains the ERPS membership setting from the second network element, comparing an ERPS membership setting at the first network element to the ERPS membership setting from the second network element. In addition, the method includes performing an action if the ERPS membership setting at the first network element is different than the ERPS membership setting from the second network element.

In another embodiment, a network element includes a processor configured to receive an administrative data packet. The processor is also configured to determine whether the administrative data packet contains an ERPS membership setting from a second network element. The processor is further configured to if the administrative data packet contains an ERPS membership setting from the second network element, compare an ERPS membership setting at the network element to the ERPS membership setting from the second network element. The processor is also configured to perform an action if the ERPS membership setting at the network element is different than the ERPS membership setting from the second network element.

In another embodiment, a method includes determining an ERPS membership setting at a network element, the ERPS membership setting associated with an Ethernet ring protection (ERP) instance. The method also includes adding the ERPS membership setting to a reserved field in an administrative data packet, the administrative data packet associated with the ERPS protocol. The method further includes sending the administrative data packet from the first network element to a plurality of network elements in the Ethernet network.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" refers to an instance of a device class, which may be referred to collectively as devices "72" and any one of which may be referred to generically as device "72".

In an Ethernet network, a network element may function as a bridge, analyzing incoming data packets and directing them to the appropriate outgoing network links based on the destination address of the data packet. The bridge may "learn" the network topology by analyzing the source addresses of the incoming data packets at each link and building an address table of network elements connected to that link. When an incoming data packet arrives, the bridge may look for the destination address within its network address table to determine the network link(s) on which to send the data packet. If the destination address is in its address table, then the bridge may forward the data packet on the appropriate network link associated with the destination address in the address table so that the data packet may ultimately reach its destination. However, if the destination address is not in its address table, then the bridge may flood the data packet to all outgoing links. A loop among the network elements may cause a network storm to occur as the network elements rebroadcast the data packet, ultimately reaching back to the source, which itself may rebroadcast the packet again. A network storm may cause network performance to degrade or possibly result in a network failure as rebroadcasting of data packets consumes exponentially increasing network resources.

In order to prevent a network storm, an Ethernet network may use a loop-breaking protocol, such as Ethernet ring protection switching (ERPS) protocol, to disable links between particular network elements in order to ensure a loop-free network topology. The loop-breaking protocol may block traffic on a port at one or more network elements to disable one or more network links between network elements. Disabling a network link may prevent the flow of data packets on the particular link, which may in turn disable loops in the network and prevent a network storm from occurring. In addition to disabling network loops, the loop-breaking protocol may also assist in maintaining a connected network in the event of a network failure. For example, the loop-breaking protocol may enable a disabled network link (e.g., by unblocking traffic a previously blocked port or link) if another network link or network element unexpectedly fails. Thus, the loop-breaking protocol may prevent network loops and help restore network connectivity in the event of a network failure.

A network may include one or more virtual local area networks (VLAN). Each VLAN may function as a separate, independent network in which data packets are forwarded among network elements associated with the VLAN using network resources assigned to the particular VLAN. A VLAN, like the underlying network described above, may experience a network storm if a loop exists between the network elements in the VLAN. A network storm in a VLAN may compromise the entire network. Thus, it may be desirable to implement a loop-breaking protocol to detect and prevent loops on the VLANs within the network.

The ERPS protocol may be configured to support one or more VLANs. For example, a network may use one or more Ethernet ring protection (ERP) instances to detect and disable network loops for one or more VLANs. However, supporting multiple VLANs with ERP instances may require coordination of settings across multiple network elements. Sometimes, such settings may be incorrect (e.g., by administrator error or out-of-date data) such that the ERPS protocol does not operate as intended. In such scenarios, loops and/or ring segmentation may occur in the network, resulting in network outages or decreased network performance. As will be described in detail herein, the present disclosure provides a novel solution for detecting when ERPS protocol settings are incorrect so that appropriate actions may be taken to ensure the continued operation of the network.

Figure 1:
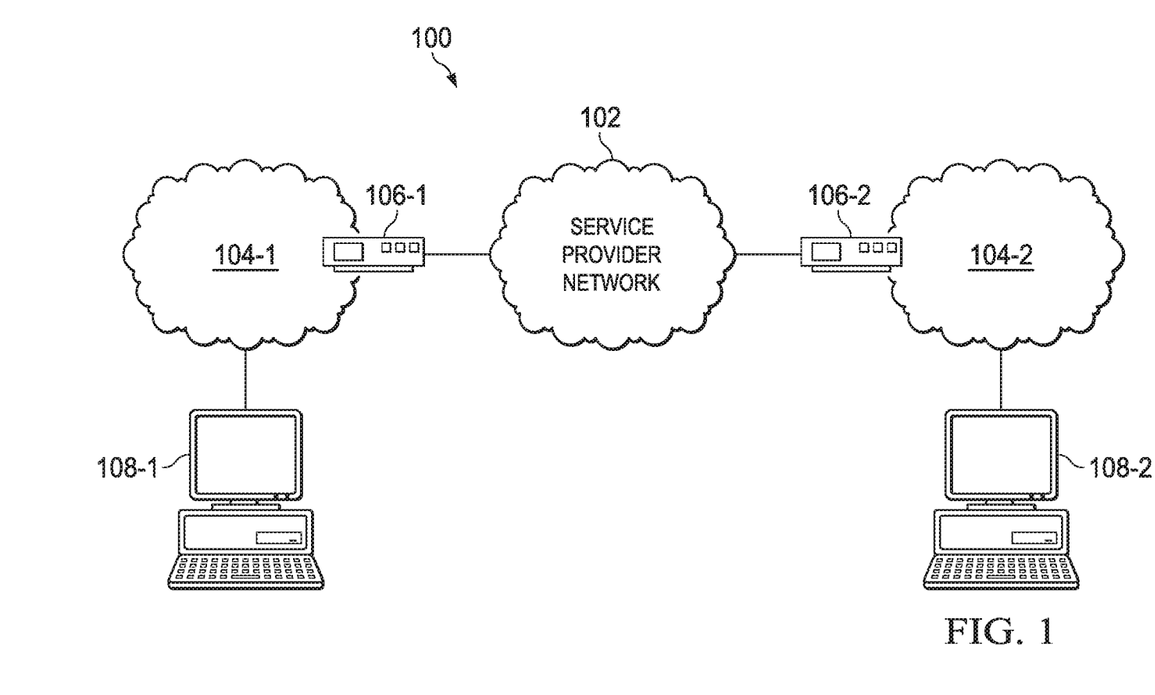
FIG. 1 illustrates a block diagram of selected elements of an embodiment of a general network according to the present disclosure.

FIG. 1 illustrates a block diagram of selected elements of an embodiment of a general network according to the present disclosure. Customer networks 104-1 and 104-2 may be communicatively coupled through service provider network 102. Namely, service provider network 102 may be configured to receive and transport traffic between the customer networks. In particular embodiments, customer network 104-1, customer network 104-2, and/or service provider network 102 may include one or more transport networks. Customer networks 104-1 and 104-2 may couple to service provider network 102 via one or more customer edge devices 106, representing a user network interface or a demarcation between customer networks 104-1 and 104-2, and service provider network 102. Customer edge device 106 may be any suitable system operable to transmit and receive network traffic, such as network element 202 disclosed with respect to FIG. 2. As an example and not by way of limitation, customer edge device 106 may be a router or switch located at or near the customer premises.

One or more customer systems 108 may be communicatively coupled to customer network 104-1 and 104-2. For example, customer system 108-1 may be coupled to customer network 104-1, and customer system 108-2 may be coupled to customer network 104-2. Although shown as desktop computer systems, customer system 108 may be any device that communicatively couples to a network, including for example, a computer, PDA, consumer electronic device, network storage device, network printer, or another suitable device and may vary in size, shape, performance, functionality, and price. Customer system 108-1 may desire to communicate information with customer system 108-2 or another system coupled to customer network 104-2. However, customer networks 104-1 and 104-2 may be located at different physical locations or otherwise lack a direct network connection. Therefore, customers may engage the services of a service provider, in the form of service provider network 102, to communicate information between customer networks 104-1 and 104-2. Service provider network 102 may provide forwarding of network traffic between various customer systems 108 coupled to customer networks 104-1 and 104-2. Specifically, service provider network 102 may provide Ethernet links to communicatively couple customer networks 104-1 and 104-2, such that in some embodiments, it may appear as though the two networks are a single local area network (LAN).

Modifications, additions, or omissions may be made to network 100 without departing from the scope of the disclosure. The components and elements of network 100 described may be integrated or separated according to particular needs. Moreover, the operations of network 100 may be performed by more, fewer, or other components. For example, in some embodiments, customer network 104 may couple to two or more service provider networks. In some embodiments, service provider network 102 may service a plurality of customers and customer networks 104.

Figure 2:
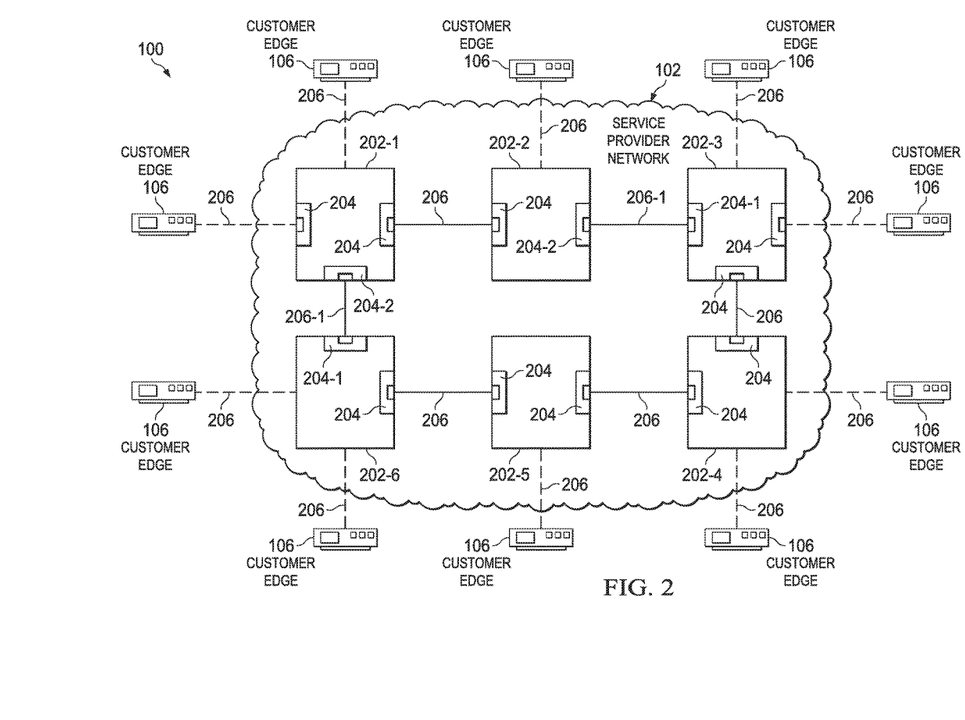
FIG. 2 illustrates a block diagram of selected elements of an embodiment of a network architecture configured in a ring topology.

FIG. 2 illustrates a block diagram of selected elements of an embodiment of exemplary network architecture 100. One or more customer edge devices 106 may be communicatively coupled via service provider network 102, which may represent an implementation of network 100 described above with respect to FIG. 1. Service provider network 102 may include network elements 202 coupled by transmission media 206 through ports 204. In certain embodiments, network elements 202 may also couple to one or more customer edge devices 106 and/or network elements 202 of other networks (not expressly shown) via transmission media 206. In some embodiments, network elements 202 in service provider network 102 may form a ring topology, such as the network ring formed by network elements 202-1→202-2→202-3→202-4→202-5→202-6 as illustrated in FIG. 2.

Network 100 may include one or more transmission media 206 operable to transport one or more signals communicated by components of network 100. Each transmission medium 206 may include any system, device, or apparatus configured to communicatively couple network elements 202 to each other and communicate information between them. For example, a transmission medium 206 may include an optical fiber, an Ethernet cable, a T1 cable, a Wi-Fi or Bluetooth connection, and/or any other suitable medium.

Network elements 202 (including customer edge devices 106) may communicate information or "traffic" over transmission media 206. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as "real-time") and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, frames or packets.

Each network element 202 in network 100 may comprise any suitable system operable to transmit and receive network traffic. For example, network element 202 may be a hub, router, switch, bridge, or any other system or device operable to transmit and receive network traffic. In the illustrated embodiment, each network element 202 may be operable to transmit traffic directly to one or more other network elements 202 and receive traffic directly from one or more other network elements 202 via transmission medium 206. As discussed above, customer edge devices 106 may be a type of network element 202. Network elements 202 may support one or more loop-breaking protocols, such as spanning tree protocol (e.g., spanning tree protocol, rapid spanning tree protocol, and multiple spanning tree protocol) or ERPS protocol, as defined by, for example, International Telecommunication Union Telecommunication Standardization Sector (ITU-T) in the G.8032 Recommendation.

Service provider network 102 may implement the ERPS protocol to identify and block network loops. A network element 202 is selected as the ring protection link (RPL) owner, charged with disabling or blocking traffic on a particular network link, referred to as the ring protection link, to ensure a loop-free network topology. To illustrate, network element 202-3 may be selected as the RPL owner in service provider network 102, and the network link between network elements 202-2 and 202-3 may be selected as the ring protection link. As the RPL owner, network element 202-3 is responsible for disabling the ring protection link between network elements 202-2 and 202-3 (e.g., by disabling port 204-1 on network element 202-3 so that data packets are not sent on transmission medium 206-1) to prevent a network loop, and re-enabling the ring protection link if an Ethernet ring failure condition occurs. Network element 202-2 may be designated as the RPL neighbor node such that it may disable and/or re-enable the ring protection link (e.g., by disabling or enabling traffic at port 204-2 on network element 202-2 so that data packets are not sent on transmission medium 206-1) should the RPL owner, network element 202-3, fail.

The ERPS protocol uses administrative data packets to coordinate ring protection. For example, the RPL owner may send a ring automatic protection switching (R-APS) administrative data packet to notify the other network elements 202 in the network that the ring protection link has been disabled (e.g., to block a network loop and prevent a network storm). Upon receipt of the R-APS packet from the RPL owner, the other network elements 202 may begin to send traffic along the ring. Network elements 202 may monitor the network links to detect a network failure, such as a failed transmission medium 206 or a failed network element 202. In the event of a network failure, one or more network elements 202 detecting the failure may send an R-APS packet to notify the other network elements 202 of the failure. The RPL owner may re-enable the ring protection link upon detecting and/or receiving a notification of the network failure. Re-enabling the ring protection link may bypass the network failure and thereby allow unaffected network elements 202 to continue communication while the failed network link or network element is down.

Service provider network 102 may include one or more virtual local area networks (VLAN). A VLAN may represent a group of one or more network elements 202 grouped into a virtual local area network such that the network elements within the VLAN appear to be part of a common, unified local area network. VLANs may be defined on a data link layer (e.g., Open Systems Interconnection layer 2) to include specific network resources, such as particular network elements 202, specific ports 204 of these elements, and/or particular transmission media 206 coupling the ports. Network elements 202 in a VLAN may be communicably coupled by one or more virtual network links. A virtual network link may be implemented with resources of service provider network 102, including for example, one or more network elements 202, transmission media 206, and/or ports 204 illustrated in FIG. 2. Network traffic from one network element 202 in a VLAN may be broadcast to other network elements 202 in the same VLAN over virtual network links, using the underlying network resources comprising the virtual network link.

In some embodiments, traffic in service provider network 102 may be compartmentalized across one or more VLANs such that the traffic is segregated into isolated broadcast domains (e.g., a broadcast domain for each VLAN). For example, traffic in one VLAN may be accessible to the network elements, users, applications, and/or customer systems within and communicating over the particular VLAN. Service provider network 102 may include one or more VLANs to efficiently control and apportion network resources based on, for example, functional needs, security needs, network usage, network reliability, and/or other considerations.

Figure 3:
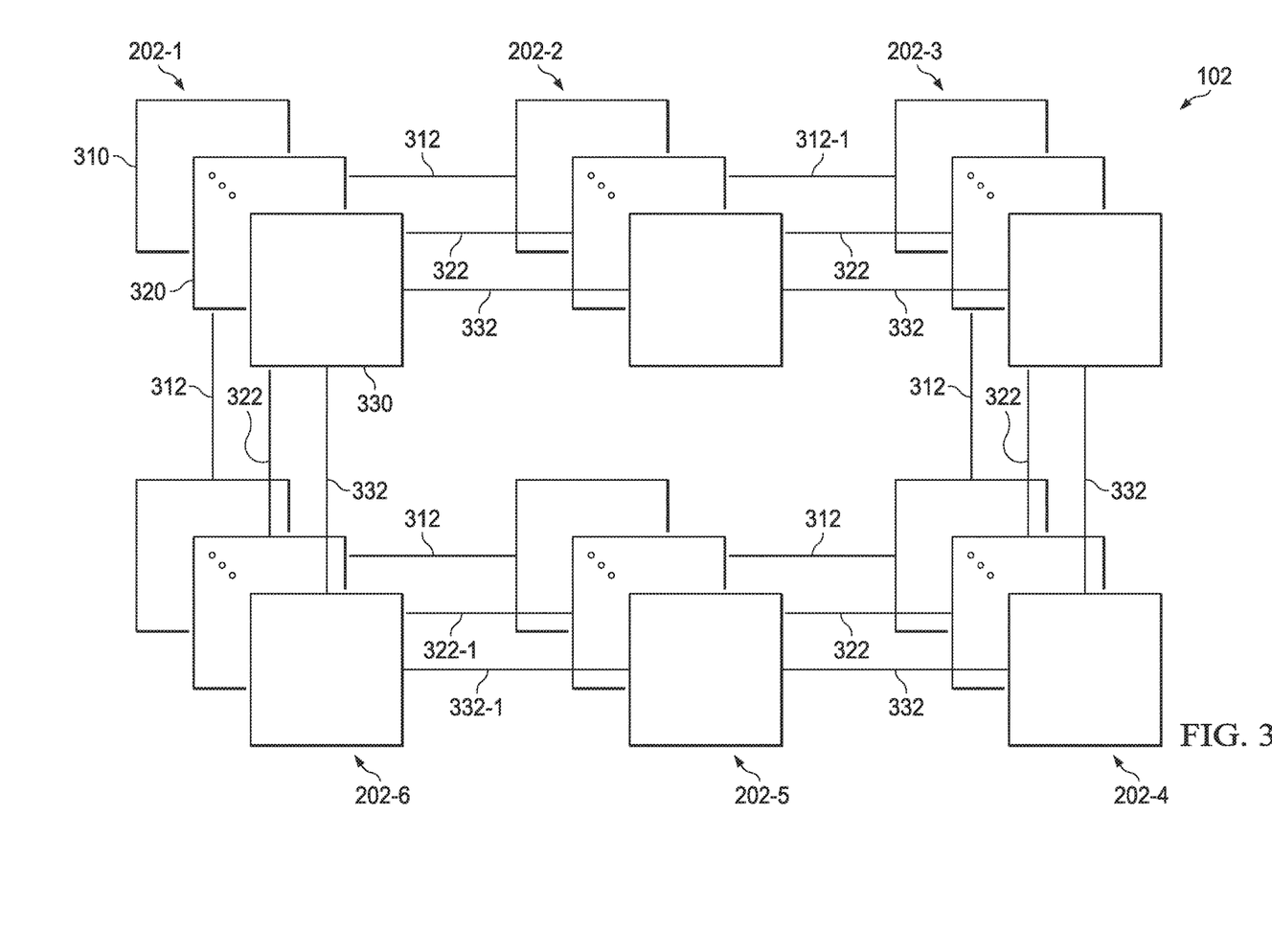
FIG. 3 illustrates a block diagram of representative virtual local area networks implemented on a service provider network.

FIG. 3 illustrates a block diagram of representative virtual local area networks implemented on service provider network 102 illustrated in FIG. 2. Service provider network 102 may include VLANs 310, 320, and 330. Each VLAN may include one or more network elements 202. For example, VLANs 310, 320, and 330 include network elements 202-1, 202-2, 202-3, 202-4, 202-5, and 202-6. Network traffic in each VLAN may be sent across virtual network links. For example, network traffic on VLAN 310 may be broadcast to other network elements in VLAN 310 via virtual network links 312. Network traffic on VLAN 320 may be broadcast on virtual network links 322. Network traffic on VLAN 330 may be broadcast via virtual network links 332. As discussed above, virtual network links 312, 322 and 332 may use the ports of network elements 202 and the transmission media coupling these ports to send and receive information.

The broadcasting of traffic on individual VLANs in service provider network 102 may result in a network storm as network elements 202 rebroadcast data packets on the virtual network links, ultimately reaching back to the source, which itself may rebroadcast the packet again. A network storm caused by packets on one VLAN may compromise the entire network.

The ERPS protocol may be configured to identify and block network loops for the VLANs in the network. For example, one or more ERP instances may be created to protect one or more VLANs.

Figure 4:
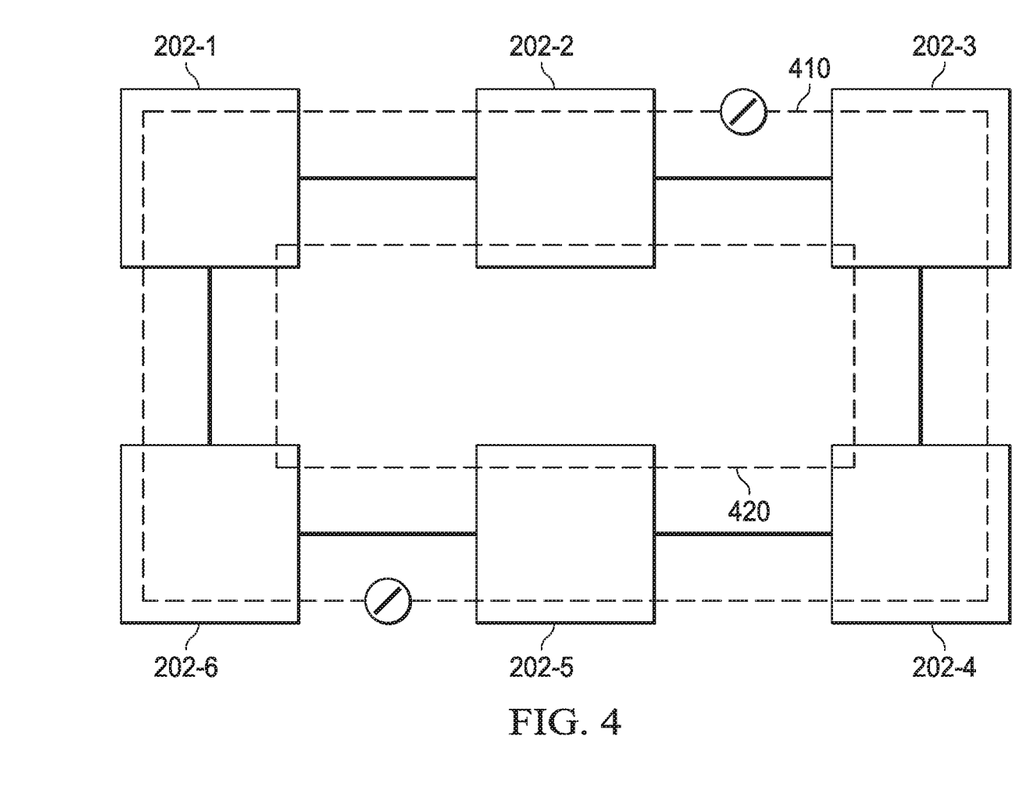
FIG. 4 illustrates a block diagram of representative Ethernet ring protection instances implemented on service provider network.

FIG. 4 illustrates a block diagram of representative ERP instances implemented on service provider network 102. Service provider network 102 includes ERP instance 410 and 420. Each ERP instance may function in a manner similar to that described above with respect to FIG. 2. For example, network element 202-3 may be selected as the RPL owner for ERP instance 410 and the network link between network elements 202-3 and 202-2 may be selected as the ring protection link. As the RPL owner, network element 202-3 may disable the ring protection link for ERP instance 410. Similarly, network element 202-6 may be selected as the RPL owner for ERP instance 420 and the network link between network elements 202-6 and 202-5 may be selected as the ring protection link. As the RPL owner, network element 202-6 may disable the ring protection link for ERP instance 420.

Each ERP instance may support one or more VLANs in the network. For example, VLAN 310 may be associated with ERP instance 410 and VLANs 320 and 330 may be associated with ERP instance 420. Thus, network element 202-3, the RPL owner for ERP instance 410, may disable the ring protection link between network elements 202-3 and 202-2 for VLAN 310 (e.g., to prevent traffic on virtual link 312-1 illustrated in FIG. 3). Despite the disablement of the ring protection link by ERP instance 410, VLANs 320 and 330 may nonetheless continue to send traffic between network elements 202-3 and 202-2. Network element 202-6, the RPL owner for ERP instance 420, may disable the ring protection link between network elements 202-6 and 202-5 for VLANs 320 and 330 (e.g., to prevent traffic on virtual links 322-1 and 332-1 illustrated in FIG. 3). Despite the disablement of the ring protection link by ERP instance 420, VLAN 310 may nonetheless continue to send traffic between network elements 202-6 and 202-5. Thus, each ERP instance may support its associated VLANs while not interfering with the traffic of other VLANs on the network.

Each ERP instance may perform protection switching procedures independently of each other. For example, an ERP instance may send administrative R-APS packets to control and manage the ring protection protocol. However, the R-APS packets may be specific to the particular ERP instance. The R-APS packets may include a ring ID to identify the ERP instance to which the packet is associated. Each ERP instance may be associated with a unique ring ID. Thus, each ERP instance may check the ring ID to determine whether the R-APS packet is associated with ERP instance. If ring ID indicates that the R-APS packet is associated with another ERP instance, then the ERP instance may ignore and/or discard the R-APS packet. Therefore, the administrative data packets between the various ERP instances may be segregated to ensure proper operation of the individual ERPS instances.

Supporting multiple VLANs with ERP instances may require coordination of settings across multiple network elements. Each network element 202 may have an instance of the ERPS protocol operating on the network element. Each network element 202 may maintain ERPS membership settings. ERPS membership settings may include one or more settings relevant to the configuration of the ERPS protocol on the network, such as the various ERP instances and the VLANs associated with each ERP instance. For example, network elements 202-1, 202-2, 202-3, 202-4, 202-5, and 202-6 may each maintain membership settings that identify ERP instances 410 and 420 and the VLANs associated with each (e.g., that VLAN 310 is associated with ERP instance 410 and VLANs 320 and 330 are associated with ERP instance 420).

In some circumstances, ERPS settings on one or more network elements 202 may be incorrect. For example, network element 202-3 may incorrectly associate VLANs 310, 320, and 330 with ERP instance 410. Based on this incorrect setting, network element 202-3, as RPL owner for ERP instance 410, may block traffic for VLANs 310, 320, and 330 across the ring protection link between network elements 202-3 and 202-2. However, network element 202-6 may correctly associate VLANs 320 and 330 with ERP instance 420. As the RPL owner for ERP instance 420, network element 202-6 may also block traffic for VLANs 320 and 330 across the ring protection link between network elements 202-6 and 202-5. Thus, the incorrect setting at network element 202-3 may cause traffic for VLANs 320 and 330 to be blocked at two network links in the network, the network link between network elements 202-6 and 202-5 and the link between network elements 202-3 and 202-2. Data packets from network elements 202-4 and 202-5 on VLANs 320 and 330 may thus be prevented from reaching network elements 202-2 and 202-1 because of the ring segmentation caused by the incorrect setting at network element 202-3. As another example, network element 202-3 may incorrectly associate VLANs 320 and 330 (not VLAN 310) with ERP instance 410. In addition to the problems explained above, VLAN 310 may experience a network loop as a result of the incorrect setting on network element 202-3, as, for example, network element 202-3 fails to block VLAN 310 traffic on the ring protection link between network elements 202-3 and 202-2 because of the incorrect setting.

Incorrect ERPS membership settings may be caused by a number of factors. For example, a network administrator may incorrectly set a setting on a particular network element 202 when setting up and/or performing maintenance on the network or the ERPS protocol. In addition, automated methods, such as scripts, programs, and/or executables, used to set up or maintain a network may malfunction or crash, causing incorrect settings on one or more network elements 202. As another example, inconsistent settings may occur during the migration of one or more VLANs to a different ERP instance (e.g., migrating VLAN 320 from ERP instance 420 to ERP instance 410 may require the update of ERPS membership settings on network elements 202-1, 202-2, 202-3, 202-4, 202-5, and 202-6).

Additional information may be added to the administrative data packets to help identify incorrect ERPS membership settings. For example, a network element 202 may broadcast its ERPS membership settings to other network elements 202 in the network. Other network elements 202 may then check the settings received from the network element 202 against the settings at the receiving network element 202. Network elements 202 may perform an action, such as notifying the network administrator of inconsistent ERPS membership settings and/or automatically updating settings to ensure proper operation of the ERPS protocol.

Referring back now to the examples of incorrect ERPS membership settings discussed above. Assume that network element 202-3 incorrectly associates VLANs 310, 320, and 330 with ERP instance 410. Network element 202-3 may receive administrative data packets from one or more other network elements 202 that correctly associate VLAN 310 (not VLANs 320 and 330) with ERP instance 410. After receiving such information, network element 202-3 may issue an alert (e.g., e-mail, text, update log entry, automated phone call, and/or another type of alert), notifying the network administrator of the inconsistent settings between the network elements. The network administrator may then take corrective action to update the settings at network element 202-3 or one or more other network elements 202, thereby preventing a network outage or dropped packages.

In some embodiments, a network element 202 may take automatic action to correct an incorrect setting. For example, network element 202-3 may automatically update its ERPS membership settings to correctly associate VLAN 310 (not VLANs 320 and 330) with ERP instance 410 after receiving administrative data packets from one or more other network elements 202 with the correct setting. In some embodiments, a network element 202 may wait to receive settings from a predetermined number of other network elements before initiating an automatic settings update. For example, network element 202-3 may wait to receive settings from at least three other network elements 202 (e.g., to ensure a certain level of confidence that the settings on the other network elements are correct) before updating its own settings. In some embodiments, a network element 202 may take automatic corrective action after receiving confirmation of the settings from the RPL owner of the ERP instance.

Checking ERPS membership settings at network elements 202 consumes time and resources. For example, sending ERPS membership settings in administrative data packets may increase the amount of administrative data sent across the network. Checking ERPS membership settings may consume resources at network elements 202, which in turn may delay other processing. Thus, in some embodiments, ERPS membership settings may be sent by a limited number of network elements 202. For example, network elements 202 designated as RPL owners may send ERPS membership settings to other network elements. The other (non-RPL owners) network elements 202 may check their settings against those received from RPL owners, but not send their own ERPS membership settings to other network elements 202. As another example, a network administrator may select certain number (e.g., ½ of the network elements) of network elements 202 to send their settings. In other embodiments, the sending and/or checking of ERPS membership settings may be limited and/or temporarily abated under certain network conditions. For example, if network usage exceeds a predetermined value and/or or a network failure has been detected, then sending and/or checking of ERPS membership settings may be reduced or stopped to ensure network resources are used for higher priority matters (e.g., reducing network latency, reducing or preventing dropped packets, recovering from a network failure, etc.).

Some ERPS administrative data packets may include ERPS membership settings as described above. However, not all ERPS administrative data packets may include ERPS membership settings. For example, in some embodiments, ERPS membership settings may be added to administrative data packets originating from certain network elements 202 (e.g., RPL owners or a subset of network elements 202) and not others so as to reduce the amount of administrative data sent over the network, to reduce the amount of processing associated ERPS protocol processing, and/or for another reason. Thus, it may be desirable to designate which ERPS administrative data packets include ERPS membership settings so that receiving network elements 202 may quickly determine whether such settings are present in the packet.

Figure 5A:
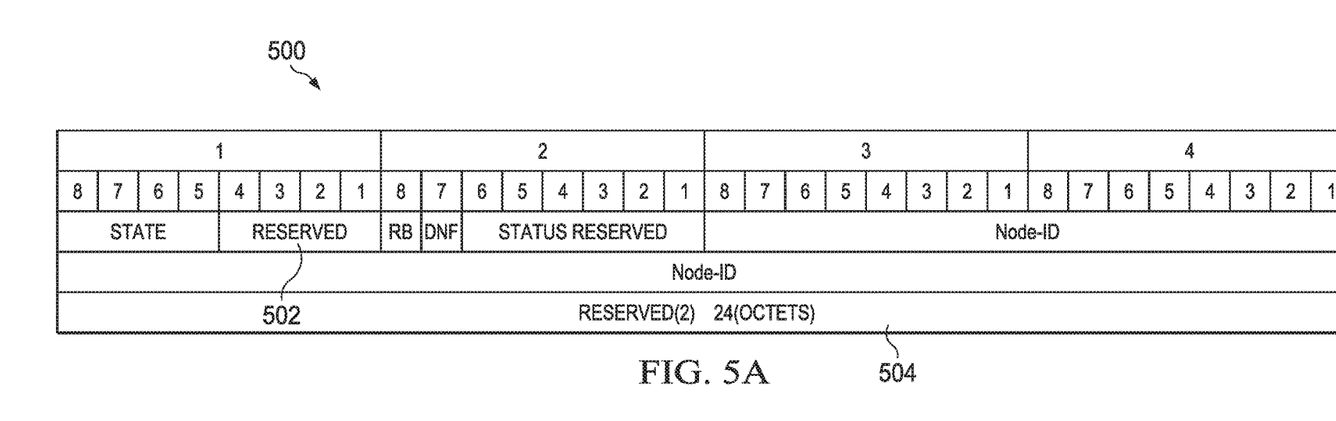
FIG. 5A illustrates a block diagram of a representative Ethernet ring protection switching R-APS administrative data packet.

FIG. 5A illustrates a block diagram of a representative ERPS R-APS administrative data packet. Data packet 500 includes multiple fields (e.g., State, RB, Node-ID) with associated space (e.g., bits). Data packet may also include one or more reserved fields, such as reserved fields 502 and 504. The reserved fields of data packet 500 may be used to transport one or more ERPS membership settings from one network element to another. Although not expressly illustrated, data packet 500 may also include a ring ID so that network elements are aware which ERP instance the data packet is associated with.

Figure 5B:
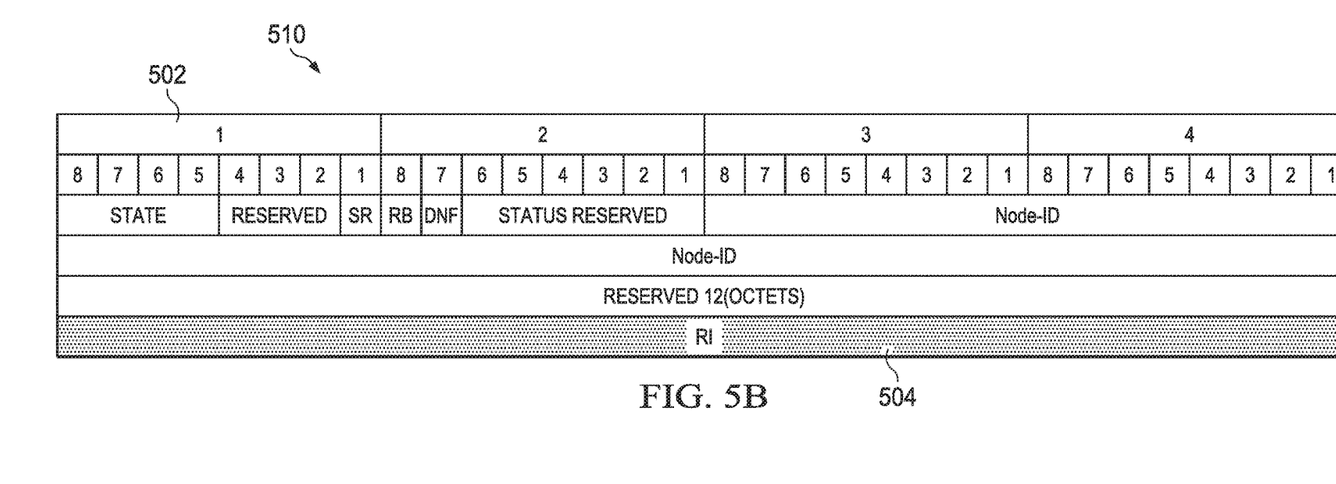
FIG. 5B illustrates a block diagram of a representative Ethernet ring protection switching R-APS administrative data packet with Ethernet ring protection switching membership settings.

FIG. 5B illustrates a block diagram of a representative ERPS R-APS administrative data packet with ERPS membership settings. Data packet 510 has been modified to include a bit in the reserved field 502. For example, a bit (e.g., labeled "FB") of the reserve field 502 may be set to a particular value (e.g., 1) as a flag to indicate that ERPS membership settings are contained in data packet 510. A network element may also include one or more ERPS membership settings in reserved field 504. For example, a network element may list all VLANs supported by a particular ERP instance in reserve field 504. Upon receipt of data packet 510, a receiving network element may check reserve field 502 to determine if ERPS membership settings are contained in data packet. When reserve field 502 indicates that ERPS membership settings are contained in the data packet (e.g., the "FB" bit in reserve field 502 set to 1), then the receiving network element may access ERPS membership settings in reserve field 504. The receiving network element may then proceed to check its own ERPS membership settings against those contained reserve field 504, for example, in the manner described above with respect to FIG. 4. By using reserved fields in the administrative data packets, network elements that have not been updated in accordance with the present invention may continue to implement the ERPS protocol as-is. That is, the present invention is intended to be backward compatible with the existing variations of the ERPS protocol.

Although the present disclosure has been described with respect to service provider network 102, the same methodology may be applied to any network configured in a ring topology, including, for example, customer networks 104 disclosed in FIG. 1. The present disclosure may also apply to different network topologies, including, networks with a ring within a ring, abutting rings, or any other network topology capable of supporting ERPS protocol. In addition, modifications, additions, or omissions may be made to service network 102 without departing from the scope of the disclosure. For example, the components and elements of service network 102 described may be integrated, separated, and rearranged according to particular needs. Moreover, the operations of service network 102 may be performed by more, fewer, or other components. For example, in some embodiments, service provider may include fewer or more network elements 202, transmission media 206, ERP instances, and/or VLANs.

Figure 6:
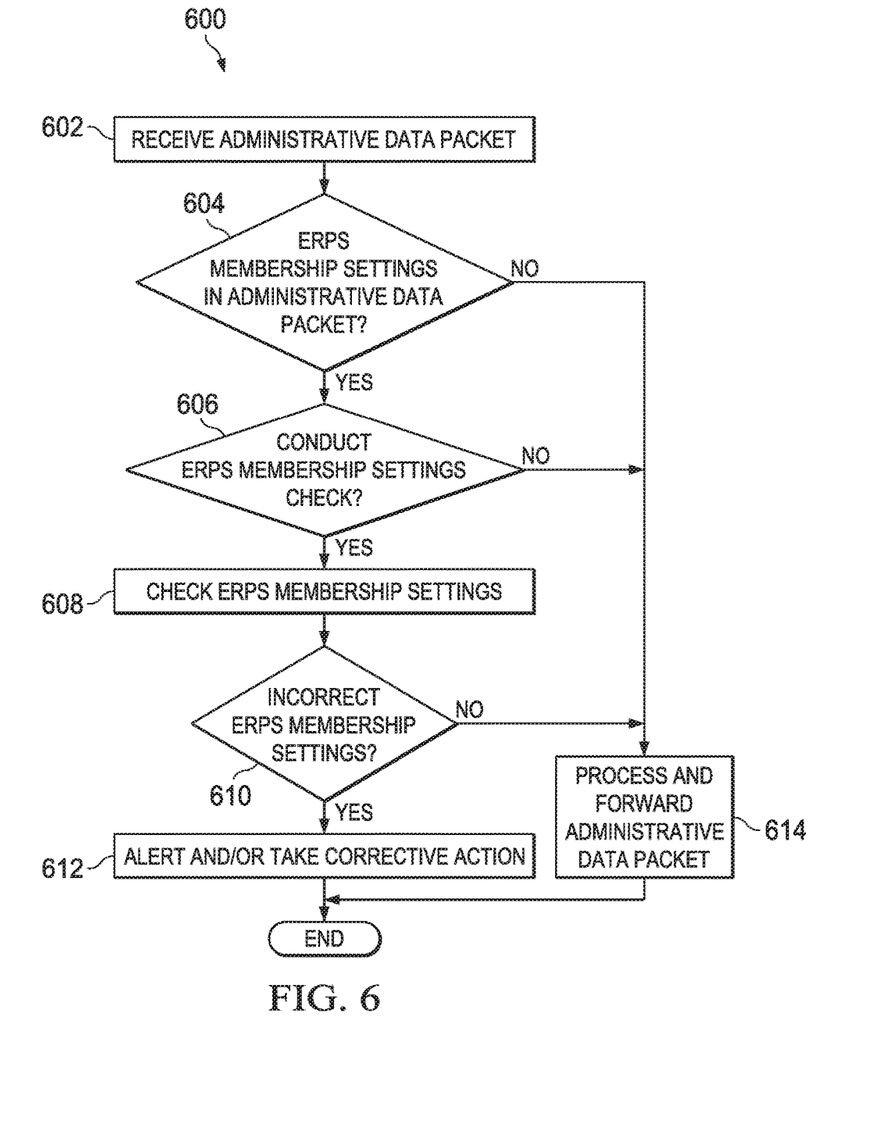
FIG. 6 illustrates a flowchart of methods for managing an ERPS protocol in an Ethernet network in accordance with some embodiments of the present disclosure.

Turning now to FIG. 6, a block diagram of selected elements of an embodiment of method 600 for managing an ERPS protocol in an Ethernet network. Method 600 may be implemented by network elements 202 disclosed above with respect to FIG. 2. Certain operations depicted in method 600 may be rearranged or omitted, as desired.

Method 600 may begin at step 602 by receiving an administrative data packet. The administrative data packet may be a R-APS data packet sent by a network element in a network implementing the ERPS protocol as described above with respect to FIG. 2. The administrative data packet may be received by another network element in the network.

At step 604, a determination may be made as to whether there are ERPS membership settings contained in the administrative data packet. For example, a reserved bit of the data packet (e.g., reserved field 502 of data packet 510 in FIG. 5B) may be set as a flag to indicate the presence of ERPS membership settings. The ERPS membership settings may be contained in the same or another reserved field of the administrative data packet (e.g., reserved field 504 of data packet 510 in FIG. 5B).

If there are no ERPS membership settings contained in the administrative data packet, then method 600 may proceed to step 614. In step 614, the administrative data packet may processed (e.g., standard steps conducted at each network element as part of the ERPS protocol) and forwarded to other network elements in the network. If, however, there are ERPS membership settings contained in the administrative data packet, then method 600 may proceed to step 606.

At step 606, a determination may be made as to whether to conduct a check of the ERPS membership settings at the receiving network element. Because checking of the ERPS protocol may consume resources of the network element, checking of the settings may be skipped in certain scenarios. For example, if network usage exceeds a predetermined value and/or or a network failure has been detected, then sending and/or checking of ERPS membership settings may skipped to ensure network resources are used for other matters (e.g., reducing network latency, reducing or preventing dropped packets, recovering from a network failure, etc.).

If there is a reason to skip checking of the ERPS membership settings, then method 600 may proceed to step 614. In step 614, the administrative data packet may be processed and forwarded to other network elements in the network. If, however, there are not reasons to skip checking of the ERPS protocol, then method 600 may proceed to step 608.

At step 608, the receiving network element may check the ERPS membership settings in the administrative data packet. For example, the ERPS membership settings contained in the administrative data packet may be compared to the settings at the receiving network element.

At step 610, a determination may be made as to whether the ERPS membership settings are incorrect. For example, if the ERPS membership settings contained in the administrative data packet are different than the settings at the receiving network element, then one or more of the settings may be incorrect. An example of incorrect ERPS membership settings is a mismatch of the VLANs supported by a particular ERP instance, as discussed above with respect to FIG. 4.

If the ERPS membership settings are correct (e.g., matching settings between the administrative data packet and the receiving network element), then method 600 may proceed to step 614. In step 614, the administrative data packet may be processed and forwarded to other network elements in the network. If, however, there are incorrect settings, then method 600 may proceed to step 612.

At step 612, the receiving network element may generate an alert and/or take action to correct the incorrect ERPS membership settings. For example, the receiving network element may issue an e-mail, text, log entry update, automated phone call, and/or another type of alert of the inconsistent settings between the network elements. In some embodiments, the receiving network element may take automatic action to correct an incorrect setting. As discussed above with respect to FIG. 4, the network element may wait for certain criteria to occur before taking automatic action.

Any of the operations of method 600 may be performed manually by, for example, a network administrator using a network management system and/or an operation support system to execute each operation. Also, any of the operations of method 600 may be performed in an automated manner by a script, program, and/or executable. In some embodiments, a combination of manual and automated means may be used to perform one or more of the operations of method 600.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing an Ethernet ring protection switching (ERPS) protocol in an Ethernet network, comprising:
   receiving an administrative data packet at a first network element;
   determining whether the administrative data packet contains an ERPS membership setting from a second network element, the ERPS membership setting includes a list of a plurality of virtual local area networks and a corresponding Ethernet ring protection instance that supports each of the plurality of virtual local area networks;
   when the administrative data packet contains the ERPS membership setting from the second network element, comparing an ERPS membership setting at the first network element to the ERPS membership setting from the second network element; and
   notifying, when the ERPS membership setting at the first network element is different than the ERPS membership setting from the second network element, a network administrator that the ERPS membership setting at the first network element is different than the ERPS membership setting from the second network element.

2. The method of claim 1, wherein the ERPS membership setting in the administrative data packet is stored in a reserved field.

3. The method of claim 1, wherein the notifying is performed after checking a status of the network or a status of an Ethernet ring protection instance.

4. The method of claim 1, wherein the administrative data packet is a ring automatic protection switching (R-APS) administrative data packet.

5. The method of claim 1, wherein determining whether the administrative data packet contains the ERPS membership setting from the second network element includes checking for a flag in the administrative data packet.

6. A network element in an Ethernet network, comprising:
   a processor;
   non-transitory computer readable memory media accessible to the processor, wherein the memory media store processor-executable instructions, the instructions, when executed by the processor, cause the processor to:
   receive an administrative data packet;
   determine whether the administrative data packet contains an ERPS membership setting from a second network element, the ERPS membership setting includes a list of a plurality of virtual local area networks and a corresponding Ethernet ring protection instance that supports each of the plurality of virtual local area networks;
   when the administrative data packet contains an ERPS membership setting from the second network element, compare an ERPS membership setting at the network element to the ERPS membership setting from the second network element; and notify, when the ERPS membership setting at the network element is different than the ERPS membership setting from the second network element, a network administrator that the ERPS membership setting at the first network element is different than the ERPS membership setting from the second network element.

7. The network element of claim 6, wherein the ERPS membership setting in the administrative data packet is stored in a reserved field.

8. The network element of claim 6, wherein the notify is performed after checking a status of the network or a status of an Ethernet ring protection instance.

9. The network element of claim 6, wherein the administrative data packet is a ring automatic protection switching (R-APS) administrative data packet.

10. The network element of claim 6, wherein determining whether the administrative data packet contains the ERPS membership setting from the second network element includes checking for a flag in the administrative data packet.

11. A method for managing an Ethernet ring protection switching (ERPS) protocol in an Ethernet network, comprising:
   receiving an administrative data packet at a first network element;
   determining whether the administrative data packet contains an ERPS membership setting from a second network element, the ERPS membership setting includes a list of a plurality of virtual local area networks and a corresponding Ethernet ring protection instance that supports each of the plurality of virtual local area networks;
   when the administrative data packet contains the ERPS membership setting from the second network element, comparing an ERPS membership setting at the first network element to the ERPS membership setting from the second network element; and
   correcting, when the ERPS membership setting at the first network element is different than the ERPS membership setting from the second network element, the ERPS membership setting at the first network element.

12. The method of claim 11, wherein the administrative data packet is a ring automatic protection switching (R-APS) administrative data packet.

13. The method of claim 11, wherein determining whether the administrative data packet contains the ERPS membership setting from the second network element includes checking for a flag in the administrative data packet.

14. A network element in an Ethernet network, comprising:
   a processor;
   non-transitory computer readable memory media accessible to the processor, wherein the memory media store processor-executable instructions, the instructions, when executed by the processor, cause the processor to:
   receive an administrative data packet;
   determine whether the administrative data packet contains an ERPS membership setting from a second network element, the ERPS membership setting includes a list of a plurality of virtual local area networks and a corresponding Ethernet ring protection instance that supports each of the plurality of virtual local area networks;
   when the administrative data packet contains an ERPS membership setting from the second network element, compare an ERPS membership setting at the network element to the ERPS membership setting from the second network element; and
   correct, when the ERPS membership setting at the network element is different than the ERPS membership setting from the second network element, the ERPS membership setting at the network element.

15. The network element of claim 14, wherein the administrative data packet is a ring automatic protection switching (R-APS) administrative data packet.

16. The network element of claim 14, wherein determining whether the administrative data packet contains the ERPS membership setting from the second network element includes checking for a flag in the administrative data packet.

* * * * *